Oct. 23, 1934.  D. W. POND  1,977,861
METHOD OF MAKING BUSHINGS FOR ELECTRIC CONDUITS
Filed Dec. 8, 1930
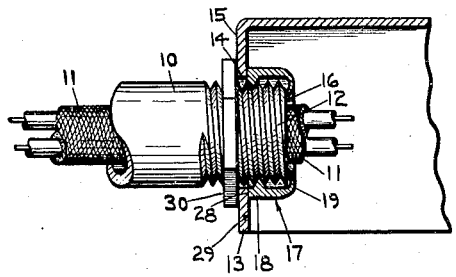
Fig.1
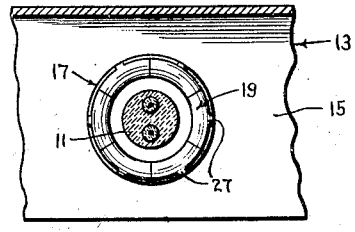
Fig.2
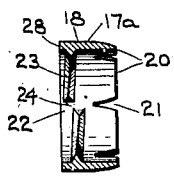
Fig.3
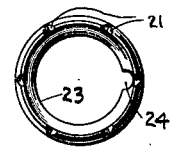
Fig.4
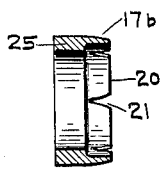
Fig.5
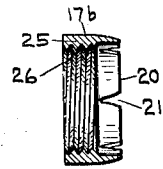
Fig.6
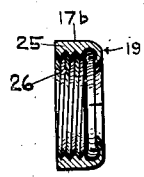
Fig.7
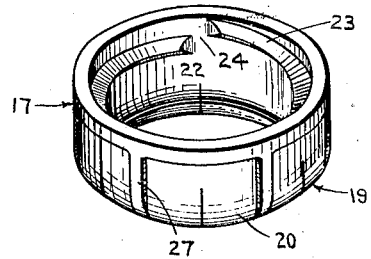
Fig.8
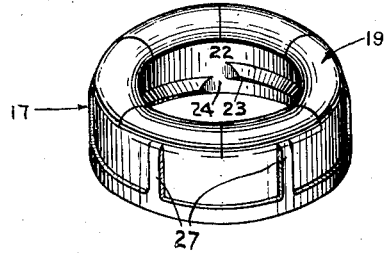
Fig.9
INVENTOR.
Dwight W. Pond
BY
ATTORNEY Patented Oct. 23, 1934

1,977,861

UNITED STATES PATENT OFFICE 1,977,861

METHOD OF MAKING BUSHINGS FOR ELECTRIC CONDUITS

Dwight W. Pond, Terryville, Conn., assignor to National Engineering Corporation, Terryville, Conn., a corporation of Connecticut Application December 8, 1930, Serial No. 500,834

5 Claims. (Cl. 10—86)

This invention relates to bushings for electric conduits. Such bushings are in use threaded on the ends of conduit pipes to cover the usually rough and burred end of the pipe and protect the conductors issuing therefrom from abrasions and cuts which might otherwise be caused by the bushings and rough edges of the pipe. In cases where the pipe enters an outlet box, the threaded bushing serves as a nut to engage the inner surface of the wall of the outlet box and cooperating with a check-nut engaging the outer surface thereof firmly clamps the end of the conduit pipe and outlet box together.

An object of the present invention is to provide such a bushing with greater economy than was heretofore possible without adversely affecting its serviceability.

In the preferred form of this invention, this is accomplished by so fashioning the bushing that its internal thread may be made in the casting of the nut by the ordinary sand-mold casting process, thereby saving by avoidance the work of cutting threads in the bushing as has been the custom. This forming of the internal thread by casting is made practicable by having the thread consist of less than one complete thread and by having the portion of the bushing which overlies and covers the rough end of the pipe cast in the form of arms lying coextensive with the body of the bushing or at least beyond the root diameter of the thread so as to permit the pattern to be drawn from the sand and avoid the need for the use of cores. These arms are later forced over and come together to form a smooth round edge on the end of the bushing body to engage the pipe end and protect the conductors from any sharp burrs or roughness thereon.

It is also within the scope of this invention to cast the bushing with a plain internal surface and with the arms which are later forced over to form the rounded end extending coextensive with the body of the bushing and to form the threads on the bushing on an automatic nut-tapping machine at a considerably reduced cost over the present method wherein the top cannot pass continuously through the bushing because of the pre-formed over-hanging flange or bead on the bushing which engages the end of the conduit pipe.

It will therefore be seen that the present invention embraces the provision of a cast piece for a bushing in which arms or projections are coextensive with the body of the bushing to be later forced over to form the over-hanging flange or bead whether or not the internal surface of the bushing is provided with cast screw-threads.

Other features and advantages will hereinafter appear.

In the accompanying drawing which illustrates both forms of my invention above referred to—

Figure 1 shows an outlet box in section with the conduit pipe supported in a hole therein and the bushing of the present invention in section and in position on the end of the conduit pipe.

Fig. 2 is an end view of the part shown in Fig. 1.

Fig. 3 is a sectional view of the casting from which the bushing shown in Fig. 1 is made.

Fig. 4 is an end view of the casting shown in Fig. 3.

Fig. 5 is a view similar to Fig. 3, showing the casting which may be threaded on an automatic and continuous threading machine.

Fig. 6 is a similar view showing the casting shown in Fig. 5 after the latter has been threaded.

Fig. 7 is a view similar to Figs. 5 and 6, showing the casting shown in Fig. 5 after it has been threaded and the over-hanging flange or bead has been formed thereon.

Fig. 8 is a perspective view of the bushing shown in Fig. 1, looking at it from the rear.

Fig. 9 is a similar view looking at the bushing from the front.

As shown in the accompanying drawing, a conduit pipe 10 carrying a conductor cable 11 has a threaded end 12 extending into an outlet box 13 through a hole 14 in a wall 15 of the box. The surface 16 at the end of the pipe is not infrequently rough and burred and hence there is danger of the cable 11 which issues from the pipe being chafed or cut while the wires are being manipulated in the outlet box. To avoid this, it has been the custom to secure on the threaded end 12 of the pipe 10 a bushing having an over-hanging flange or bead to cover a surface 16 of the pipe.

The bushing 17 of this invention serves the same purpose, having a body portion 18 and at one end an over-hanging flange or bead 19 for covering the end surface 16 of the pipe 10.

Heretofore, these bushings were usually made by casting and had the over-hanging flange cast thereon. Hence, in order to provide a screw-thread on the internal surface of the bushing, it was necessary to tap each individual bushing. Although dial and conveyor-feed type automatic tapping machines have been developed which would tap the bushings quite rapidly, nevertheless the cost of tapping remained quite high. The bushings could not be tapped on a continuous nut tapping machine where the tap does not have to be reversed and withdrawn from the piece because the over-hanging flange would not permit the tap to continue through the piece.

These difficulties are obviated and the cost of manufacturing bushings reduced substantially by the present invention by providing the casting from which bushings may be formed, without the over-hanging flange or bead, so that as contemplated in one form of the invention, bushings may be threaded on the continuous nut tapping machine or, as at present preferred, the thread may be formed on the internal surface of the bushing in the casting operation.

Accordingly, as shown in Figs. 3 and 5, the castings 17a and 17b do not have an over-hanging flange 19 as initially formed, but instead have arms or projections 20 co-extensive with the body portion 18 spaced by V-shaped notches 21 between them so that, when these arms 20 are forced inwardly by peening or spinning, the overhanging bead or flange 19 will be formed, the notches 21 between the arms 20 being substantially closed in this operation as shown in Fig. 2, to form a continuous smooth surface for the protection of the insulation of the wires issuing from the pipe 10.

In the preferred form of this invention shown in Figs. 1 to 4, 8 and 9, the internal surface 22 of the casting 17a is so molded as to have a thread 23 formed thereon in the casting operation. This thread 23 which has the desired pitch is not, however, a complete thread, for otherwise it could not be formed by a sand-casting operation. Accordingly, as shown, a space 24 is left between the ends of the thread 23 and this space is only as wide as it need be to permit the pattern used to form the mold from which the casting is made to be drawn from the sand without spoiling the mold.

Hence, it will be seen that the piece shown in Fig. 3, after being cast, need only be cleaned and have the arms 20 peened over to make it ready for use as a bushing on the end of a conduit pipe 10.

In the form of the invention shown in Figs. 5, 6 and 7, the wall 25 of the casting is made thicker than in the form shown in Fig. 3, so that after the casting has been cleaned a thread 26 may be cut on its internal surface as shown in Fig. 6 on a continuous nut tapping machine. After the threads are cut, one end of the hole through the casting is reduced in size to substantially that of the internal diameter of the conduit pipe 10 by peening over the arms 20 to the position shown in Fig. 7.

Externally the bushing 17 of this invention may have any suitable or desirable shape. As shown, it is provided with spaced ribs 27 to permit it to be gripped without slipping by a pair of pliers or to be driven on the pipe by means of a screwdriver and hammer.

In practice, the bushing 17 has sufficient length so that when its over-hanging flange or bead 19 engages the end 16 of the pipe, its rear edge 28 may be brought into engagement with the internal surface 29 of the wall 15 of the outlet box and yet allowing a sufficient portion of the pipe 10 to project into the outlet box. In this way the pipe may be clamped to the outlet box by the bushing engaging the surface 29 of the wall 15 in cooperation with a lock or check-nut 30 which may be drawn against the outer surface of the wall 15.

Thus it will be seen that the bushing of the present invention while being more economical to manufacture still serves the purposes and functions of the bushings heretofore customarily used.

Variations and modifications may be made within the scope of this invention and portions of the improvements may be used without others.

Having thus described the invention, what is claimed as new and for which it is desired to obtain Letters Patent, is:—

1. The method of making a bushing for electric conduit pipes which consists in making a casting with a hole extending clear through the same, and at one end with annularly spaced tapering arms lying parallel with the axis of the hole; and subsequently pressing said arms toward each other and toward the axis of the hole to partially close the hole at one end of the casting and form a substantially continuous annular flange.

2. The method of making a bushing for electric conduit pipes which consists in making a casting with a hole extending clear through the same, and at one end with annularly spaced tapering arms lying parallel with the axis of the hole; providing a thread on the internal surface of the casting in such manner as to permit free longitudinal removal without rotation relative to the thread and the arm-forming portions of the mold; and subsequently pressing said arms toward each other and toward the axis of the hole to partially close the hole at one end of the casting and form a substantially continuous annular flange.

3. The method of making a bushing for electric conduit pipes which consists in making a casting with a hole extending clear through the same, with a thread cast on its internal surface and with a plurality of spaced tapering arms; and subsequently displacing said tapering arms at one end of the casting inwardly toward the axis of the hole therein to partially close one end of the hole of the casting and form a substantially continuous annular flange.

4. The method of making a malleable iron bushing for electric conduit pipes which consists in making a casting with a hole extending clear through the same and with a thread cast on its internal surface; and subsequently partially closing one end of the hole by displacing the metal of said end of the casting inwardly beyond the cylindrical plane of the root diameter of the thread.

5. The method of making a malleable iron bushing for electric conduit pipes which consists in making a casting with a hole extending clear through the same and with a thread cast on its internal surface to fit the thread of the conduit pipe; and subsequently displacing the metal at one end of the casting inwardly sufficiently to reduce the diameter of the hole at said end of the casting to substantially that of the internal diameter of the conduit pipe intended to receive the bushing.

DWIGHT W. POND.